US009946872B1

(12) United States Patent
Kleimeyer et al.

(10) Patent No.: US 9,946,872 B1
(45) Date of Patent: Apr. 17, 2018

(54) HACK-PROOF COMPUTER INTERFACE

(71) Applicant: Mimicc, LLC, Panama City Beach, FL (US)

(72) Inventors: Mark Anthony Kleimeyer, Panama City Beach, FL (US); Steven James Shamrock, Grand Island, FL (US); Christian Thomas Chicles, Orlando, FL (US); Lydia Chicles, Orlando, FL (US); David Michael Booth, Deltona, FL (US); Matthew A Panzo, Eustis, FL (US)

(73) Assignee: Mimicc, LLC, Panama City Beach, FL (US)

( * ) Notice: Subject to any disclaimer, the term of this patent is extended or adjusted under 35 U.S.C. 154(b) by 0 days.

(21) Appl. No.: 15/710,806

(22) Filed: Sep. 20, 2017

(51) Int. Cl.
*G06F 21/53* (2013.01)
*G06F 21/55* (2013.01)
*G06F 21/56* (2013.01)
*G06F 9/455* (2018.01)
*G06F 21/57* (2013.01)

(52) U.S. Cl.
CPC ............ *G06F 21/53* (2013.01); *G06F 21/554* (2013.01); *G06F 21/566* (2013.01); *G06F 9/45558* (2013.01); *G06F 21/57* (2013.01)

(58) Field of Classification Search
CPC ...... G06F 21/53; G06F 21/554; G06F 21/566; G06F 9/45558; G06F 21/57
See application file for complete search history.

(56) References Cited

U.S. PATENT DOCUMENTS

| 7,757,001 | B2 | 6/2010 | van Leperen |
| 8,160,564 | B1 | 4/2012 | Gunasekara et al. |
| 8,266,241 | B1 | 9/2012 | Neubrand et al. |
| 8,585,321 | B2 | 11/2013 | Hoang |
| 8,805,089 | B2 | 8/2014 | Chang et al. |

(Continued)

OTHER PUBLICATIONS

Microsoft, Microxoft RemoteFX, (at least as early as) Jul. 6, 2017 (at least as early as this date) https://technet.microsoft.com/en-us/library/ff817578(v=ws.10).aspx.

(Continued)

*Primary Examiner* — Jung W Kim
*Assistant Examiner* — Carlos M De Jesus Lassala
(74) *Attorney, Agent, or Firm* — Mehrman Law Office; Michael J. Mehrman

(57) ABSTRACT

A hack-proof computer interface between a public-side operating system and a private-side operating system utilizing a "King's food taster" approach. A public-side operating system is exposed to the outside world, while a private-side operating system is isolated from the outside world except through the hack-proof interface. This effectively prevents infection of the private-side operating system with viruses or other computer malware from the outside world. The hack-proof interface includes a bitmap-coupled interface, such as a camera capturing a video image of the visible computer screen public-side operating system. A security device, such as a video scrambler or security lens, distorts or decimates the video image sufficiently to prevent active virus code from passing through the bitmap-coupled interface. A user-controlled input interface, such as hardware or software switches, allows a user to selectively direct keyboard and mouse commands to the public-side operating system or the private-side operating system.

17 Claims, 3 Drawing Sheets

(56) References Cited

U.S. PATENT DOCUMENTS

| | | |
|---|---|---|
| 9,053,250 B2 | 6/2015 | Halim et al. |
| 9,141,332 B2 | 9/2015 | Coleman et al. |
| 9,204,028 B2 | 12/2015 | Ishii et al. |
| 9,235,452 B2 | 1/2016 | Abdo et al. |
| 9,361,469 B2 | 6/2016 | Thiyagarajan et al. |
| 9,448,815 B2 | 9/2016 | Pahlavan et al. |
| 9,557,953 B2 | 1/2017 | Olmo et al. |
| 9,600,350 B2 | 3/2017 | Jooste |
| 9,658,931 B2 | 5/2017 | Simons et al. |
| 2012/0005390 A1 | 1/2012 | Hoang |
| 2015/0012831 A1 | 1/2015 | Boggess |
| 2015/0052067 A1 | 2/2015 | Thiyagarajan et al. |
| 2016/0212103 A1 | 6/2016 | Rhodes et al. |

OTHER PUBLICATIONS

Toptracker, Exceptional Time Tracking Softwarefor Remote Teams and Individuals, Jul. 7, 2017 (at least as early as this date), https://www.toptal.com/tracker/.

HACK-PROOF COMPUTER INTERFACE

TECHNICAL FIELD

The present invention is directed to computer security systems and, more particularly, to a hack-proof computer interface using a public side computer and a private side computer interconnected though a bitmap-coupled interface, a security device, and a user-controlled input interface.

BACKGROUND

The news continually describes computer hacking ranging from massive breaches to "ransom ware" directed at small businesses and individuals. The virus protection keeps blocking the criminals, and the criminals keep finding ways around the virus protection. Some types of protection are expensive, while others required a fairly high level of sophistication to implement and maintain. Those who are on the lower end of the computer sophistication scale are often the most vulnerable. There is, therefore, a continuing need for a hack-proof computer interface that is effective yet easy to use.

SUMMARY

The present invention may be embodied in a hack-proof computer interface that utilizes a public-side operating system exposed to an interconnected network including the Internet, and a private-side operating system that is isolated from the outside world except through a security interface with the public-side operating system. A bitmap-coupled interface provides the private-side operating system with a bit-map video image of a largely visible spectrum computer interface controlled by the private-side operating system. A security device distorts or decimates the video image sufficiently to prevent active virus code from passing through the bitmap-coupled interface in a manner that is imperceptible to a human operator viewing the video image. A user-controlled input interface selectively directs keyboard and mouse commands to the public-side operating system or the private-side operating system. The public-side operating and the private-side operating system may be deployed in separate enclosures or in the same enclosure.

In the event that the user wants to download files from the outside world to be accessed by the private-side operating system, the external files are screened for viruses and quarantined on an external memory, such as a hard drive. Once the file has been opened and sufficient scanning, testing and operations have been performed with the public-side operating system, the external file can be made accessible to the private-side operating system. In a first embodiment, the public-side and private-side operating systems are each deployed in separate computers and the bitmap-coupled interface is a camera positioned to view the computer screen of the public-side operating system. In a second embodiment, the public-side operating system is a smartphone, the private-side operating systems is a separate computer, and the bitmap-coupled interface is a camera extending from a docking station for the smartphone positioned to view the screen of the smartphone. In a third embodiment, the public-side and private-side operating systems are both deployed in a common housing and the bitmap-coupled interface is an electronic LCD-to-CCD interface operating largely in the visible light spectrum. The user-controlled input interface may be one or more hardware switches, wireless switches, or software switches. The public-side operating system may be deployed on an easily removed and replaced PC board allowing for easy replacement in the event of infection.

It will be understood that specific embodiments may include a variety of features in different combinations, as desired by different users. In view of the foregoing, it will be appreciated that the present invention provides an effective yet easy to use hack-proof computer interface. The specific techniques and structures for implementing particular embodiments of the invention and accomplishing the associated advantages will become apparent from the following detailed description of the embodiments and the appended drawings and claims.

BRIEF DESCRIPTION OF THE FIGURES

The numerous advantages of the invention may be better understood with reference to the accompanying figures in which.

DETAILED DESCRIPTION

The embodiments of the invention include any suitable combination of a public-side operating system and a private-side operating system utilizing a "King's food taster" hack-proof interface. This analogy is apt because the private-side operating system effectively uses a potentially sacrificial public-side operating system to interface with the outside world, while the private-side operating system remains protected by only interacting with the outside world through a secure interface with the public-side operating system. The private-side operating system accesses external files only after they have be received and tested by the public-side operating system. In other words, the public-side operating system is exposed to the outside world, while the private-side operating system is isolated from the outside world except through the public-side operating system by way of the hack-proof interface. This effectively prevents infection of the private-side operating system with viruses or other computer malware from the outside world. The hack-proof interface includes a bitmap-coupled interface, such as a camera capturing a video image of the visible computer screen public-side operating system. A security device, such as a video scrambler or security lens, distorts or decimates the video image sufficiently to prevent active virus code from passing through the bitmap-coupled interface. A user-controlled input interface, such as a hardware or software keyboard and mouse switches, allows a user to selectively direct keyboard and mouse commands to the public-side operating system or the private-side operating system. Like "the King's food taster," any computer infection impacts only the potentially sacrificial public-side operating system exposed to the outside world, while leaving the private-side operating system untouched.

Figure 1:
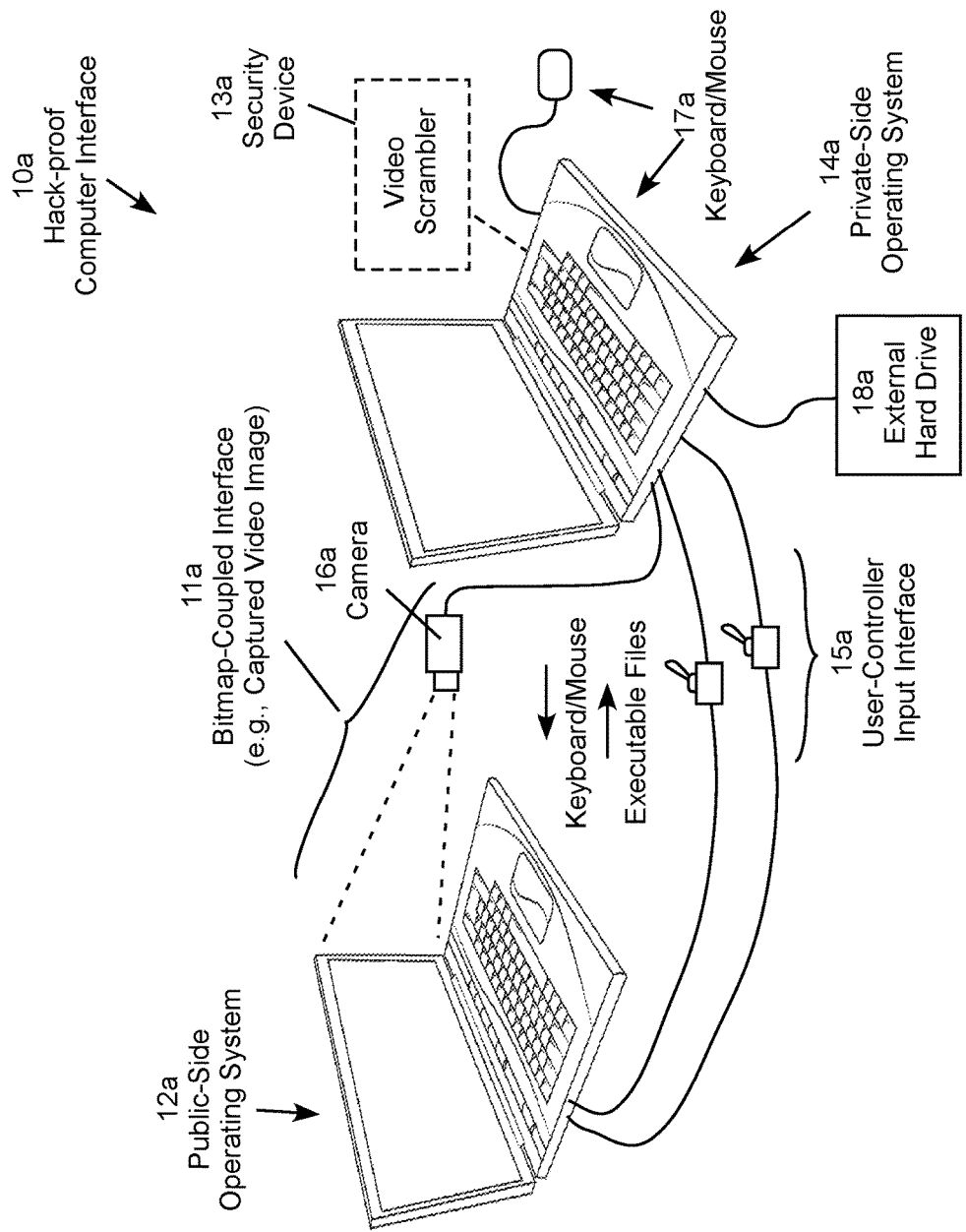
FIG. 1 is a conceptual illustration of a first type of hack-proof computer interface where the public-side and private-side operating systems are both deployed on laptop computers.

FIG. 1 is a conceptual illustration of a first type of hack-proof computer interface 10a where the public-side operating system 12a and the private-side operating system 14a are deployed on separate laptop computers. A bitmap-coupled interface 11a protected by a security device 13a provides a hack-proof interface between the public-side and private-side operating systems. In this example, the bitmap-coupled interface 11a is an optical camera 16a operating largely in the visible spectrum capturing a bit-map video image of the display screen on the computer running the public-side operating system 12a. The computer running the private-side operating system 14a includes a display screen that selectively views the video image created by the camera 16a as altered by the security device 13a. A display, camera or other device should be considered to operate "largely in the visible spectrum" if a portion of the information captured, displayed or transmitted by the device in the visible spectrum is operative to cause human visible images to be displayed by the computer running the private-side operating system 14a, even if additional information is transmitted outside the visible spectrum, for example in the infrared, ultraviolet or other portion of the electromagnetic spectrum, or through another suitable mode of communication.

The computer running the private-side operating system 14a also includes the usual input devices illustrated by the keyboard/mouse 17a in this example. A user controlled interface 15a, illustrated in this example as two hardware switches in wired connections, allows keyboard/mouse generated by the keyboard/mouse 17a to be selectively directed to the public-side operating system 12a or the private-side operating system 14a. The user controlled interface 15a also allows executable files to be selectively downloaded from the public-side operating system 12a to an external hard drive 18a, where the executable files can be accessed by the private-side operating system 14a only after the files have been scanned for viruses, opened, and sufficiently tested by the public-side operating system 12a.

In this embodiment, the camera 16a feeds the video signal to the computer running the private-side operating system 14a, where it is selectively displayed on the display screen of the computer running the private-side operating system 14a. The security device 13a in this example is a video scrambler that decimates the video image to prevent viruses or other executable code from being transmitted across the bitmap-coupled interface 11a in a manner that is imperceptible to a human operator viewing the camera feed on the display screen of the of the computer running the private-side operating system 14a. For example, the video scrambler may randomly flip a small percentage of the bit-map pixels each frame, such as one or two percent of the pixels, where the pixels selected for flipping changes randomly from frame to frame. Many other video scrambler techniques may be used so long as the result prevents viruses or other executable code from being transmitted across the bitmap-coupled interface in a manner that is imperceptible to a human operator viewing the video image at the computer running the private-side operating system.

Figure 2:
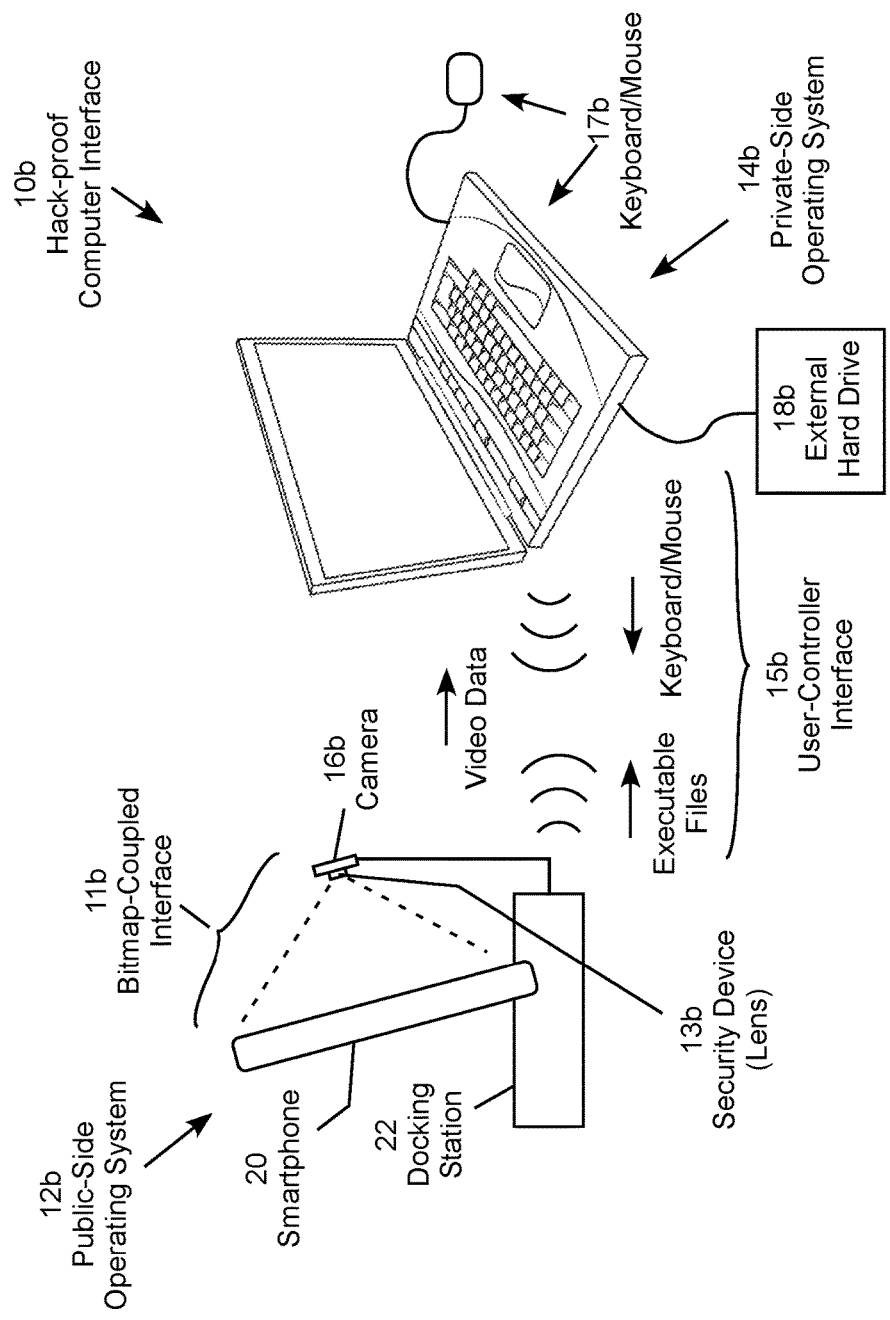
FIG. 2 is a conceptual illustration of a second type of hack-proof computer interface where the public-side operating system is deployed on a smartphone, and the private-side operating system is deployed on a laptop computer.

FIG. 2 is a conceptual illustration of a second type of hack-proof computer interface 10b where the public-side operating system 12b is deployed on a smartphone 20, while the private-side operating system 14b is deployed on a laptop computer. A bitmap-coupled interface 11b protected by a security device 13b provides a hack-proof interface between the public-side and private-side operating systems. In this example, the bitmap-coupled interface 11b is an optical camera 16b operating largely in the visible spectrum capturing a bit-map video image of the display screen on smartphone 20. The computer running the private-side operating system 14a includes a display screen that selectively views the video image created by the camera 16b as altered by the security device 13b. In this embodiment, the smartphone 20 is supported by a docking station 22, which also supports the camera 16b in a position where it captures an image of the display screen on the smartphone 20. The docking station 22 provides power to keep the battery of the smartphone 20 charged while keeping the screen display on.

The computer running the private-side operating system 14b also includes the usual input devices illustrated by the keyboard/mouse 17b in this example. A user controlled interface 15b, illustrated in this example as two wireless interfaces controlled by software switches (e.g., "hotkey" keyboard commands), allows keyboard/mouse commands generated by the keyboard/mouse 17b to be selectively directed to the public-side operating system 12b running on the smartphone 20 or the private-side operating system 14b. The user controlled interface 15b also allows executable files to be selectively downloaded from the public-side operating system 12b to an external hard drive 18b, where the executable files can be accessed by the private-side operating system 14b only after the files have been scanned for viruses, opened, and sufficiently tested by the public-side operating system 12b.

In this embodiment, the camera 16b feeds the video signal to the computer running the private-side operating system 14b, where it is selectively displayed on the display screen of the computer running the private-side operating system 14b. The security device 13b in this example is an optical security lens that optically or digitally distorts the video image to prevent viruses or other executable code from being transmitted across the bitmap-coupled interface 11a in a manner that is imperceptible to a human operator viewing the camera feed on the display screen of the of the computer running the private-side operating system 14a. For example, the security lens may optically or digitally alter or remove a small percentage of the bit-map pixels each frame, such as one or two percent. Again, other security lens techniques may be used so long as the result prevents viruses or other executable code from being transmitted across the bitmap-coupled interface in a manner that is imperceptible to a human operator viewing the video image at the computer running the private-side operating system 14a.

Figure 3:
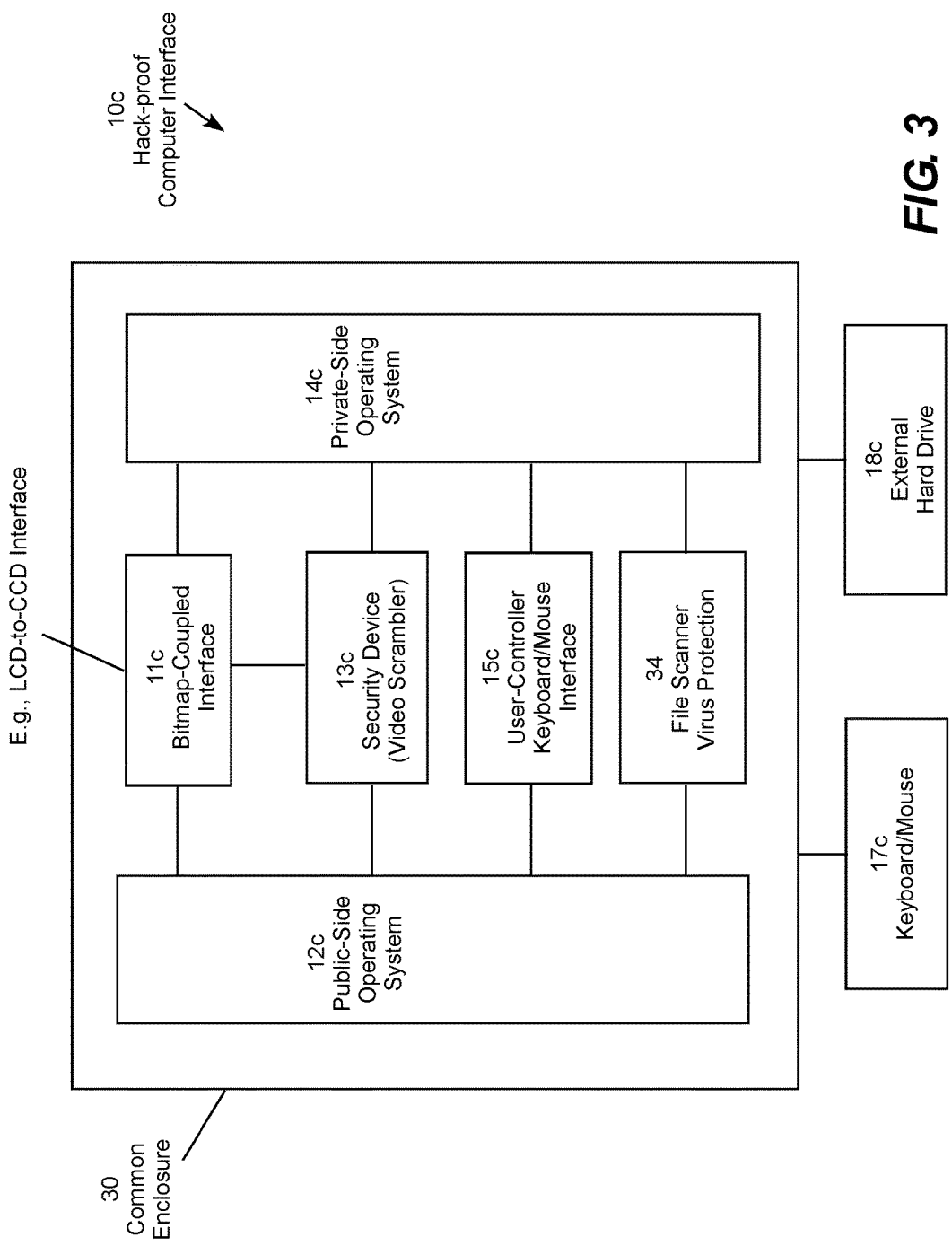
FIG. 3 is a conceptual illustration of a third type of hack-proof computer interface where the public-side and private-side operating systems are both deployed on PC boards inside a single enclosure, such as a laptop computer.

FIG. 3 is a conceptual illustration of a third type of hack-proof computer interface 10c, which is conceptual similar to the first embodiment shown in FIG. 1, except that the public-side operating system 12c and the private-side operating system 14c are both deployed on PC boards inside a common enclosure 30, such as a laptop computer. The public-side operating system 12c may be deployed by a separate microprocessor deployed on a separate PC board that is easily removed and replaced in the event that it becomes corrupted. In this embodiment, the bitmap-coupled interface 11c may be a tiny LCD to CCD electronic interface operating largely in the visible spectrum, because a human perceptible display screen is not required to transfer bit-map video images between the operating systems in the embodiment. In the future, many personal computing devices may be configured with this type of "King's food taster" dual-operating system configuration to provide increased security that is effective and easy to use for a wide range of computer users.

In this example, a bitmap-coupled interface 11c protected by a security device 13c provides a hack-proof interface between the public-side operating system 12c and private-side operating system 14c. The bitmap-coupled interface 11c is this embodiment includes an LCD-to-CCD electronic interface operating largely in the visible spectrum. For example, a tiny CCD chip may capture a bit-map video image created by a tiny LCD chip without the need for a large human-readable computer screen. The computer running the private-side operating system 14c includes a display screen that selectively views the video image created by the CCD chip as altered by the security device 13c.

The computer running the private-side operating system 14c also includes the usual input devices illustrated by the keyboard/mouse 17c in this example. A user controlled interface 15c, such as "hot-key" keyboard command, allows keyboard/mouse generated by the keyboard/mouse 17c to be selectively directed to the public-side operating system 12c or the private-side operating system 14c. The user controlled interface 15c also allows executable files to be selectively downloaded from the public-side operating system 12c to an external hard drive 18c, where the executable files can be accessed by the private-side operating system 14c only after the files have been scanned for viruses, opened, and sufficiently tested by the public-side operating system 12c.

In this embodiment, the CCD chip feeds the video signal to the computer running the private-side operating system 14c, where it is selectively displayed on the display screen of the computer running the private-side operating system 14c. The security device 13c in this example is a video scrambler that digitally distorts or decimates the video image to prevent viruses or other executable code from being transmitted across the bitmap-coupled interface 11c in a manner that is imperceptible to a human operator viewing the camera feed on the display screen of the of the computer running the private-side operating system 14c. For example, the video scrambler may randomly flip a small percentage of the bit-map pixels each frame, such as one or two percent, where the pixels selected for flipping changes randomly from frame to frame. Many other video scrambler techniques may be used so long as the result prevents viruses or other executable code from being transmitted across the bitmap-coupled interface in a manner that is imperceptible to a human operator viewing the video image at the computer running the private-side operating system.

In view of the foregoing, it will be appreciated that the present invention provides significant improvements in computer security. The foregoing relates only to the exemplary embodiments of the present invention, and that numerous changes may be made therein without departing from the spirit and scope of the invention as defined by the following claims.

The invention claimed is:

1. A computer system featuring a security interface and a user-controlled input interface, comprising: public-side operating system exposed to an interconnected network including the Internet; a private-side operating system isolated from the interconnected network except through the security interface with the public-side operating system; the security interface comprising a bitmap-coupled interface displaying an at least in part visible spectrum bit-map video image of the public-side operating system to the private-side operating system; wherein the security interface distorts or decimates the visible spectrum bit-map video image sufficiently to prevent active virus code from passing through the bitmap-coupled interface in a manner that is imperceptible to a human operator viewing the visible spectrum bit-map video image; and a wherein the user-controlled input interface selectively directs keyboard and mouse commands to the public-side operating system or the private-side operating system.

2. The computer system of claim 1, wherein the public-side and private-side operating systems are deployed in separate enclosures.

3. The computer system of claim 1, wherein the public-side and the private-side operating systems are deployed in a common enclosure.

4. The computer system of claim 1, further comprising an external memory for storing computer files received by the public-side operating system and making them available to the private-side operating system after security screening.

5. The computer system of claim 1, wherein the public-side operating system is deployed in a laptop computer, the private-side operating system is deployed in a different laptop computer, and the bitmap-coupled interface comprises a camera positioned to capture images of a display screen of the laptop computer running the public-side operating system.

6. The computer system of claim 1, wherein the public-side operating system is deployed in a smartphone, the private-side operating system is deployed in a laptop computer, and the bitmap-coupled interface comprises a camera positioned to capture images of a display screen of the smartphone.

7. The computer system of claim 6, wherein the camera is supported by a docking station supporting the smartphone.

8. The computer system of claim 1, wherein the security interface comprises a video scrambler computer software component.

9. The computer system of claim 1, wherein the security interface comprises an optical lens.

10. The computer system of claim 1, further comprising a user-operated switch that selectively directs the keyboard and mouse commands to the public-side operating system or the private-side operating system.

11. A non-transient computer storage medium storing computer-executable instructions for causing a computer system to implement a computer-controlled process, comprising: running a public-side operating system exposed to an interconnected network including the Internet; running a private-side operating system isolated from the interconnected network except through the security interface with the public-side operating system; displaying an at least in part visible spectrum bit-map video image of the public-side operating system to the private-side operating system; distorting or decimating the visible spectrum bit-map video image sufficiently to prevent active virus code from passing through the visible spectrum bit-map video image in a manner that is imperceptible to a human operator viewing the visible spectrum bit-map video image; and selectively directing keyboard and mouse commands to the public-side operating system or the private-side operating system.

12. The computer storage medium of claim 11, wherein the public-side and private-side operating systems are deployed in separate enclosures.

13. The computer storage medium of claim 11, wherein the public-side and the private-side operating systems are deployed in a common enclosure.

14. The computer storage medium of claim 11, wherein the computer-controlled process further comprising receiving computer files received by the public-side operating system into an external memory and making them available to the private-side operating system after security.

15. The computer storage medium of claim 11, wherein the computer-controlled process further comprising receiving the bit-map video image of the public-side operating system from a camera positioned to capture images of a display screen of a laptop computer running the public-side operating system.

16. The computer storage medium of claim 11, wherein the computer-controlled process further comprising receiving the bit-map video image of the public-side operating system from a camera positioned to capture images of a display screen of a smartphone.

17. The computer storage medium of claim 16, wherein the camera is supported by a docking station supporting the smartphone.

\* \* \* \* \*